United States Patent [19]

Miller

[11] Patent Number: 5,390,977
[45] Date of Patent: Feb. 21, 1995

[54] D-RING FOR SEAT BELT RESTRAINTS

[75] Inventor: Harold J. Miller, Mt. Clemens, Mich.

[73] Assignee: General Motors Corporation, Detroit, Mich.

[21] Appl. No.: 65,299

[22] Filed: May 24, 1993

[51] Int. Cl.$^6$ .............................................. B60R 22/26
[52] U.S. Cl. .................. 297/216.13; 297/216.14; 297/480; 297/483; 296/68.1; 280/806; 280/808
[58] Field of Search .................. 297/483, 480, 216.12, 297/216.13, 216.14; 296/68.1; 280/808, 806, 805

[56] References Cited

U.S. PATENT DOCUMENTS

| | | | |
|---|---|---|---|
| 3,471,197 | 10/1969 | Ely | 297/483 |
| 3,810,657 | 5/1974 | Campbell | 280/150 SB |
| 3,829,123 | 8/1974 | Holka | 280/150 SB |
| 3,995,885 | 12/1976 | Plesniarski | 280/747 |
| 4,624,422 | 11/1986 | Hollowell | 280/806 X |
| 4,687,253 | 8/1987 | Ernst | 297/480 X |
| 4,718,696 | 1/1988 | Koide et al. | 280/801 |
| 4,738,485 | 4/1988 | Rumpf | 297/216 |
| 4,840,404 | 6/1989 | Falterman | 280/808 |
| 5,015,010 | 5/1991 | Homeier et al. | 280/808 |
| 5,149,135 | 9/1992 | Konishi | 280/808 X |

FOREIGN PATENT DOCUMENTS

| | | | |
|---|---|---|---|
| 0377861B1 | 2/1994 | European Pat. Off. | |
| 2516113 | 10/1976 | Germany | 297/216.14 |
| 3741-831-A | 6/1989 | Germany | |
| 3808459 | 9/1989 | Germany | 280/806 |
| 3912027 | 10/1989 | Germany | 280/806 |
| 3931973 | 4/1991 | Germany | 280/806 |
| 4123428 | 1/1993 | Germany | 280/806 |
| 191148 | 11/1982 | Japan | 280/808 |
| 57-191148 | 11/1982 | Japan | |
| 1-314657 | 12/1989 | Japan | |

*Primary Examiner*—Peter R. Brown
*Assistant Examiner*—David E. Allred
*Attorney, Agent, or Firm*—Ernest E. Helms

[57] ABSTRACT

A vehicle seat and occupant restraint arrangement for a vehicle is provided which, in a preferred embodiment, includes a seat pan member having forward and rearward ends, a seat back joined with the seat pan rearward end, the seat back having an upper end, a D-ring joined to the seat back generally adjacent the upper end of the seat back, an anchor being generally fixed with respect to the vehicle, an occupant restraint belt with a first end operatively associated with the anchor, the restraint belt being threaded through the D-ring, and a lock plate mounted on legs of the D-ring to catch the occupant restraint belt upon sudden excessive acceleration of the vehicle in the forward direction to tension the restraint belt between the D-ring and the anchor to minimize angular movement of the seat back rearwardly.

2 Claims, 1 Drawing Sheet

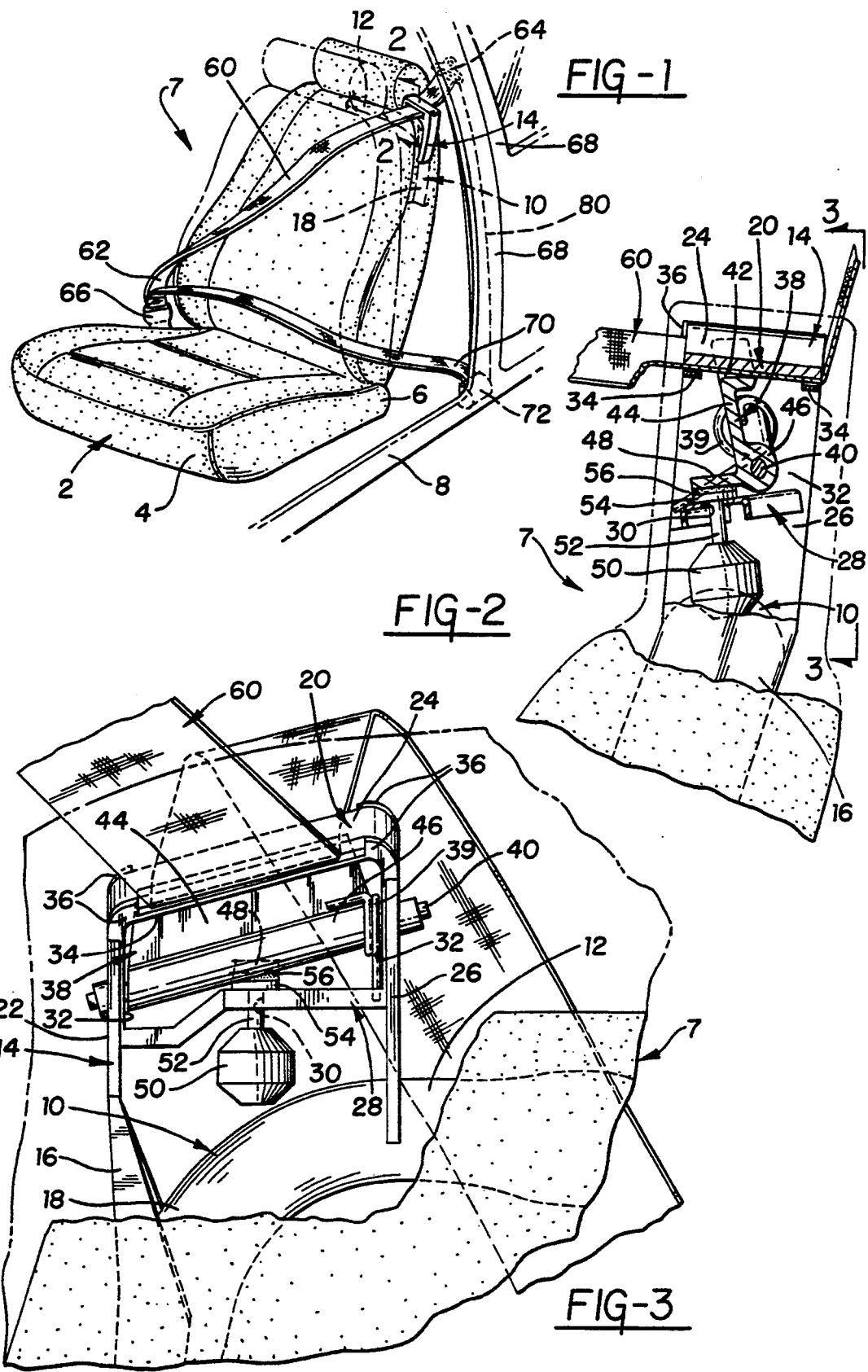

D-RING FOR SEAT BELT RESTRAINTS

FIELD OF THE INVENTION

The field of the present invention is that of vehicle seat occupant restraint belt arrangements particularly for vehicle seats in the forward row seating of dual row seating vehicles.

BACKGROUND OF THE INVENTION

Most of the design restraints associated with vehicle seating are primarily concerned with preventing the vehicle seat going forward in a frontal impact crash. However, sometimes it is desirable to prevent the front seat back from possibly going rearward. Presently, the main factors which prevent rearward movement of the seat back is the structural integrity of the seat. It is desirable to somehow utilize the occupant belt restraint system to aid in preventing the rearward movement of the seat back. Allowing the occupant restraint system to aid in preventing the rearward movement of the seat back in rear impact crashes would allow the vehicle seat to experience a reduction in mass and therefore aid in meeting the environmentally mandated goal of reduction of vehicle weight to increase gas mileage, thereby helping to further cleanse the environment.

SUMMARY OF THE INVENTION

To meet the above-noted challenges, the present invention in a preferred embodiment brings forth a vehicle seat and restraint arrangement wherein the restraint belt is threaded through a D-clamp connected with the upper end of the seat back. Another end of the belt restraint is operatively associated with an anchoring mechanism which has portions elevated and rearward of the seat back. The belt is freely allowed to move through the D-clamp in normal operation. Upon a sudden rear impact, the D-clamp closes, causing the restraint belt to be placed in tension between the D-clamp and the anchoring mechanism, which in turn causes a retention of the restraint belt to aid in the prevention of any possible rearward movement of the seat back.

BRIEF DESCRIPTION OF THE DRAWINGS

FIG. 1 is a perspective view of a preferred embodiment of the present invention.

FIG. 2 is a view taken along line 2—2 of FIG. 1.
FIG. 3 is a view taken along line 3—3 of FIG. 2.

DESCRIPTION OF THE PREFERRED EMBODIMENT

Referring to FIGS. 1 through 3, the vehicle seat and restraint arrangement 7 of the present invention has a seat pan member 2 having a forward end 4 toward the forward end of the, vehicle 8 and a rearward end 6 toward the rearward end of the vehicle 8. The pan member 2 is typically metallic and has an encompassing elastomeric foam cushion which is covered by a suitable flexible membrane of cloth, vinyl or leather.

Joined toward the rearward end 6 of the seat pan member in an adjustably tiltable or fixed manner is the seat back frame 10. The seat back frame 10 is also covered to provide a surface for contact with the vehicle occupant in a manner similar to the seat pan member 2. The seat back frame 10 is generally an inverted U-shape having its ends joined to the seat pan member and having a cross bar 12 adjacent its upper end.

Joined to an upper end of the seat back frame is a D-ring 14. The attachment of the D-ring 14 to the frame will typically be by welding or other suitable means. The D-ring 14 has a side arm 16 which is joined to a side 18 of the seat back frame 10. The D-ring 14 also includes an integrally joined channel 20 having a first upward extending leg 22, a second cross leg 24 and a third descending leg 26 which mates with the cross bar 12 of the seat back frame.

The D-ring 14 also has a sheet metal formed cross bridge 28 having an aperture 30. The cross bridge 28 is joined with sidewalls 32 and two belt alignment cross bars 34. The cross bridge 28, sidewall 32 and alignment cross bars 34 are also integrally joined to four edge flanges 36 which are bent to wedge the cross bridge 28 within the channel 20.

Above the cross bridge 28 is a pivotally mounted lock plate 38 which pivots on a cross pin 40 projecting through the two channel legs 22, 26 of the D-ring. The alignment cross bars 34 provide a slotted aperture between the top of the channel and align an inserted restraint belt 60 therethrough (note in FIGS. 2 and 3, a front portion of the restraint belt 60 is elevated for clarity of illustration) to keep the restraint belt adjacent the top portion of the D-ring 14. The lock plate 38 has a locking surface 42, an arm 44, a cylindrical portion 46 which mounts on the cross pin 40, and a projected flap 48.

A weight 50 is connected with an elongated member 52, which is in turn connected with a washer 54 which holds the weight 50 on the cross arm 28. A rubber washer 56 is juxtaposed between the flap 48 and the washer 54 to prevent rattling noise. Typically, the rubber washer 56 will be connected with the washer 54. Under normal circumstances, the washer 54 will be held flat against the cross bridge 28, and there will be a slight space between the rubber washer 56 and the projected flap 48. Upon an excessive acceleration of the vehicle caused by a rear impact, inertia will cause the weight 50 to pivot rearwardly (counterclockwise as shown in FIG. 2), tilting the washer 54 to pivot the projecting flap 48 of the locking plate, causing the locking plate 38 to catch and lock the restraint belt 60 against the cross leg 24.

The restraint belt 60, which is also part of the shoulder harness, has an intermediate section 62 connected (or, as shown, looped) with the latch 66 for the seat belt and has a first end 80 going through a loop 64 on a D-pillar 68. The ring 64 is elevated and rearward of the D-ring 14. The first end 80 and a second end 70 of the restraint belt are affixed with a dual drum retractor 72, which also locks upon a rear impact. Alternatively, the first end 80 of the restraint belt may be directly anchored with the vehicle. Therefore, upon rear impact, any angular movement of the seat back frame 10 rearwardly will be restrained by the tension restraint belt 60 between the D-ring 14 and the loop 64 on D-pillar 68.

A low force torsion clock 39 spring biases the lock plate 38 in a nonlocking position (counterclockwise as shown in FIG. 2) so that the restraint belt 60 may pass through freely during normal operation of the D-ring 14.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat and occupant restraint arrangement for a vehicle having forward and rearward ends, the arrangement comprising:

a seat pan member having forward and rearward ends;

a seat back joined with the seat pan rearward end, the seat back having an upper end;

a D-ring joined to the seat back generally adjacent the upper end of the seat back;

a first anchor means including a retractor which locks upon experiencing an excessive forward acceleration of the vehicle being generally fixed with respect to the vehicle;

a shoulder harness with a first end operatively associated with the first anchor means, the shoulder harness being threaded through the D-ring, and the shoulder harness being normally freely passable through the D-ring; and inertia locking means in the D-ring to cause the D-ring to catch the shoulder harness upon sudden excessive acceleration of the vehicle in the forward direction to tension the shoulder harness between the D-ring and the anchor means to minimize angular movement of the seat back rearwardly.

2. A vehicle seat and occupant restraint arrangement for a vehicle having forward and rearward ends, the arrangement comprising:

a seat pan member having forward and rearward ends;

a seat back joined with the seat pan adjacent the rearward end, the seat back having an upper end;

a D-ring joined to the seat back generally adjacent the upper end of the seat back;

a first anchor means including a retractor which locks upon experience of an excessive forward acceleration of the vehicle and being generally fixed with respect to the vehicle;

a shoulder harness with a first end threaded through the D-ring extending upwardly through a loop which is elevated and rearward of the D-ring positioned on a B-pillar of the vehicle, and the shoulder harness is then operatively associated with the first anchor means, the shoulder harness being normally freely passable through the D-ring; and inertia locking means in the D-ring to cause the D-ring to catch the occupant restraint belt upon excessive acceleration of the vehicle in the forward direction to tension the restraint belt between the D-ring and the first anchor means to minimize any angular movement of the seat back rearwardly.

* * * * *